Nov. 24, 1959 — J. F. WALTON ET AL — 2,914,719
ISOLATED POWER SUPPLY
Filed Sept. 13, 1957 — 2 Sheets-Sheet 1
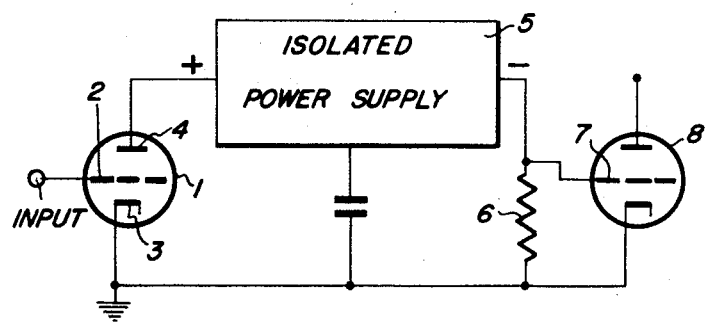
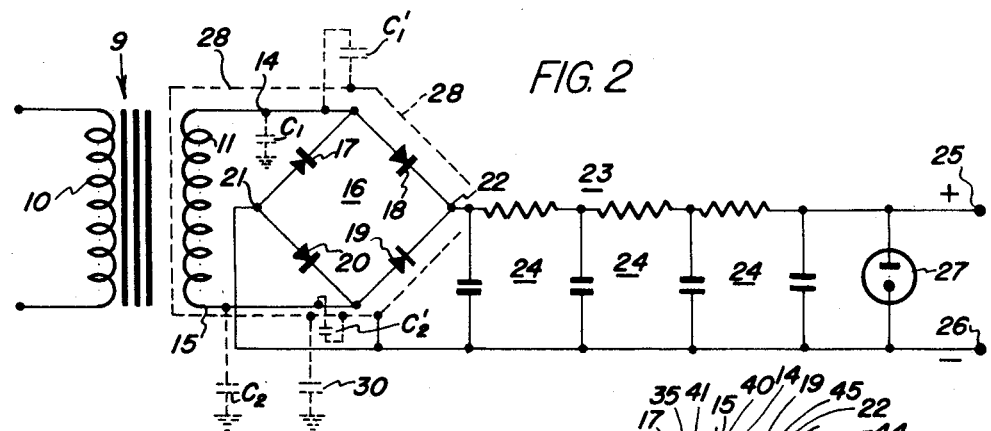
INVENTORS,
JOHN F. WALTON
JOHN H. REAVES
BY
ATTORNEY INVENTORS,
JOHN F. WALTON
JOHN H. REAVES
BY
Hurvitz and Rose
ATTORNEY

United States Patent Office 2,914,719
Patented Nov. 24, 1959

2,914,719

ISOLATED POWER SUPPLY

John F. Walton, Arlington, and John H. Reaves, McLean, Va., assignors to Elcor, Inc., Falls Church, Va., a corporation of Virginia Application September 13, 1957, Serial No. 683,740

16 Claims. (Cl. 321—8)

The present invention relates to the construction of anode power supplies for electron tubes and more particularly to the construction of a low noise, low capacitance anode power supply.

In recent years there has been increasing demand for individual anode power supplies for electron tubes in order to eliminate the need for large bulky centralized power supplies. In electronic systems employing large numbers of vacuum tubes and particularly in large digital systems wherein load requirements may vary drastically from moment to moment, the voltage regulatory circuits required to stabilize the output voltage of centralized power supplies become quite complex and highly expensive. In an effort to overcome the problems of cost and space encountered in the fabrication and utilization of centralized power supplies for systems employing large numbers of tubes, individual plate power supplies have been developed. The advantage of the individual supply over a centralized supply lies in the fact that no load-to-full load current variations are relatively small and in consequence rather inexpensive and uncomplicated regulatory circuits may be employed to maintain the required voltage regulation.

The present invention is particularly concerned with individual power supplies having extremely low-capacitance to ground so that the supply may be employed in unique direct-coupled A.C. or D.C. amplifiers to be described subsequently. The advantages of direct coupled amplifiers over capacitive coupled amplifiers are well known, particularly where the amplifier is to be employed in pulse or digital circuits in which non-uniformity of the capacitive reactance of the coupling capacitor over the frequency band produces degradation of the signals. Although direct-coupled amplifiers have an almost unlimited frequency response, these circuits are not as extensively employed as might be expected due to grid bias problems resulting from the high D.C. component of the voltage at the anode of the preceding stage. The high D.C. component of the anode voltage is due to the fact that the anode power supply is connected between ground and the anode load resistance of each stage.

The type of power supply with which the present invention is concerned has a very low shunt capacity to ground and may be connected between the anode of a tube and its load resistor which has one end connected to ground. Since the power supply has a very low shunt capacity to ground, little degeneration of the signal across the anode load occurs except at extremely high frequencies. The main benefit derived from such a circuit is that with one end of the load resistor grounded, there is only a very small D.C. component appearing across the load resistor and in consequence, the cathode of the succeeding stage may be connected directly to ground even though the grid of this stage is directly connected to the ungrounded end of the plate load resistor of the preceding stage. A low capacity power supply suitable for utilization in such direct coupled circuits is described in the article, "Bias Supplies for Direct Coupled Circuits," written by Mr. John H. Reaves, and appearing in the August, 1954 issue of Electronics, on pages 172 and 173. The power supply described in the article employs a specially constructed power transformer having a generally square or rectangular core with a primary winding disposed about one leg of the core and a secondary winding disposed about an opposed leg of the core and separated therefrom by a relatively large air gap. The air gap between the core and the secondary winding provides an unusually low value of shunt capacity between the transformer secondary and the grounded core and the large displacement between the primary and secondary windings of the transformer substantially eliminates the capacity between the secondary and primary windings. The rectifiers and other circuit elements associated with the secondary winding of the supply are mounted on insulating material and removed from the proximity of the transformer core, chassis, and other grounded elements. In consequence of this arrangement, a power supply has been provided having a shunt capacity to ground of 20 micro-microfarads or less. Although the power supply described fulfilled all the varied requirements of an individual power supply for utilization in direct coupled circuits, such as low shunt capacity to ground and excellent regulation, it was found that rather severe voltage disturbances were produced at a repetition rate equal to the power line frequency or twice the power line frequency, depending upon whether half-wave or full-wave rectification was employed. These disturbances were quite appreciable and although were smallest when a bridge type rectifier circuit was employed, still amount to as much as 0.3 volt from zero to peak magnitude across a load resistance of 10,000 ohms. Analysis of the voltage disturbances disclosed that they constituted very high frequency damped oscillations and, although it is not intended to limit the present invention to the following analysis, are believed to be caused for the following reasons. Considering, for the purposes of explanation, a half-wave rectifier circuit connected through a conventional filter circuit to a load, upon the voltage across the secondary of the power transformer attaining a proper polarity, conduction occurs through the rectifier of the half-wave rectifier circuit so as to charge the filter capacitors. Upon discontinuance of the conduction of the half-wave rectifier which occurs as the sine wave supply voltage passes its peak value, current through the secondary winding ceases substantially instantaneously and produces a sudden collapse of the electromagnetic field about the secondary winding. It is believed that this sudden cessation of current through the secondary winding shock excites a parallel resonant circuit constituting the secondary winding of the transformer and the shunt capacitance-to-ground of the transformer and transfers the energy stored in the magnetic field to this circuit. In the half-wave rectifier circuit employed in accordance with the concepts of the present invention, a load resistor is in shunt with a portion of the shunt capacity of the transformer secondary winding and therefore the oscillatory voltage appearing across this portion of the shunt capacity also appears across the load resistance. Thus, it can be seen that after each cycle of conduction of the rectifier circuit a damped oscillatory voltage appears across the load resistor. In the case of a half-wave circuit these voltages were appreciably greater than 0.3 volt discussed above, which was the voltage developed by a bridge type rectifier circuit.

In accordance with a preferred embodiment of the invention, the aforementioned voltage disturbances are substantially eliminated by completely shielding the secondary winding of the transformer and by mounting the rectifier elements on the transformer secondary winding structure and within the shield and further by connecting the shield to one of the output leads of the power supply. By thus shielding the secondary circuit and the rectifier elements and connecting the shield to one of the output leads, the capacity between the shield and ground appears in shunt with the load resistor and constitutes the shunt capacity discussed above. The voltage disturbances which previously produced voltages of the order of magnitude of 0.3 volt across a ten thousand ohm resistance are reduced to a value of the order of magnitude of 50 microvolts. It must be noted that the shield is not primarily employed to shield the secondary winding from outside effects although it does perform this function.

The shield of the present invention is primarily employed to alter the circuit arrangement with respect to the oscillatory circuit so that the damped oscillatory disturbances will not flow through the load resistor. Specifically, by substantially completely enclosing the secondary winding in a conductive shield and connecting the shield to one of the output terminals of the circuit, the oscillatory circuit is no longer grounded at any point and therefore cannot produce a voltage disturbance across the grounded load resistor.

It is also of interest to note that the shield about the secondary winding is slotted so that a complete conductor is not provided which would act as a short-circuited secondary turn. The slot must be maintained quite small and it is believed that the small amount of capacity permitted between the secondary winding and ground due to the slot is responsible for the small remaining voltage disturbance which still appears across the load resistor.

Further in accordance with the present invention, where the supply is to be employed for generating high voltages the secondary winding of the transformer may comprise two individual windings each mounted on a bobbin and having half the number of turns of the secondary winding. The connection between the two windings is made between the end of the wires disposed at the end of the innermost turn of each winding and the connections to the rectifiers are made from the ends of the outermost turns of the secondary windings. In consequence of this arrangement, a voltage insulation problem which would be encountered if one end of a single secondary were brought from the bottom end of the winding to the top end of the winding along the side of the winding is eliminated. In this embodiment of the invention, the rectifier may be physically mounted on the insulating spacer or spacers disposed between the individual halves of the secondary winding.

Although it is not absolutely essential that the rectifiers and the leads from the secondary winding or windings be shielded, only a partial reduction of the voltage disturbances is achieved if these members are not enclosed within the shield. In the embodiment of the invention employing a single secondary winding the diodes may be disposed on an insulated insert held against the top layer of the windings by securing the leads of the winding to the insert. In this manner the diodes may be conveniently disposed within the shield.

It is an object of the present invention to provide a low noise, low capacity anode voltage power supply for electron tubes.

It is another object of the present invention to provide individual power supplies for electron tubes having low shunt capacity to ground and low noise.

It is another object of the present invention to provide a low noise, low capacity power supply for electron tubes wherein the secondary winding of the power transformer is wholly enclosed within a split shield connected to one of the output terminals of the power supply.

It is yet another object of the present invention to provide a low noise, low capacity power supply employing a power transformer having a secondary winding separated from the core of the transformer by an air gap and having the rectifying elements of the power supply and the secondary winding wholly enclosed within a split electrostatic shield directly connected to one of the output terminals of the power supply.

It is another object of the present invention to provide a low noise, low capacity power supply employing a power transformer having a secondary winding spaced from the transformer core by an air gap and a secondary winding consisting of two individual windings connected together at the ends of the innermost turns of the two individual portions of the winding.

These and other objects and advantages of the present invention will become apparent upon a reference to the accompanying drawings, wherein:

Figure 1 is a circuit diagram illustrating the type of circuit in which the power supply of the present invention is intended to be employed;

Figure 2 is an electrical circuit diagram of the power supply of the present invention;

Figure 3 is a perspective view of the transformer of the present invention employing a single secondary winding;

Figure 7 is a perspective view of a secondary winding structure employing two half windings.

Figure 4:
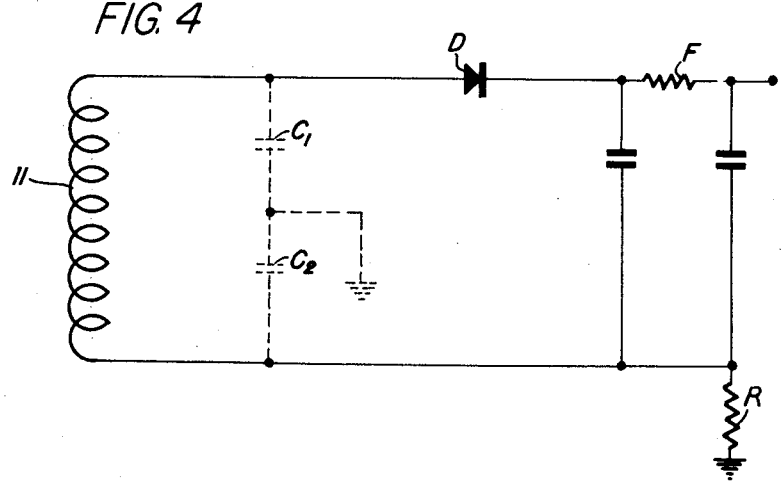
Figures 4–6 are schematic circuit diagrams employed to explain the theory of operation of the present invention.

Referring specifically to Figure 1 of the accompanying drawings, an electron tube 1 has its grid 2 connected to a source of signal voltage (not illustrated), its cathode 3 connected to ground, and its anode 4 connected to the positive side of a power supply 5 is connected through a load resistor 6 to ground and is also connected to a grid 7 of a second electron tube 8. As previously indicated the advantages of the type of circuit illustrated in Figure 1 is that direct coupling may be employed between the load resistor 6 of the amplifier circuit including tube 1 and the grid 7 of the tube 8 without requiring special grid bias circuits. To be able to utilize such a circuit, the capacity of the power supply 5 to ground must be quite small so that it does not shunt the load resistor 6 at high frequencies and destroy the response of the amplifier at these frequencies. The capacity of the supply 5, which supply is the type discussed in the aforementioned article by John H. Reaves, has a shunt capacity to ground of the order of magnitude of 20 micro-microfarads or less which has little shunting effect upon the lead 6 except at extremely high frequencies.

The circuit diagram of the supply employed in Figure 1 is illustrated in Figure 2 and comprises an input power transformer 9 having a primary winding 10 connected across a standard source of commercial A.C. power and a secondary winding 11. Referring momentarily to Figure 3, the construction employed to achieve the low capacity to ground of the secondary winding 11 of the transformer 9 is illustrated. The primary winding 10 is disposed on one leg of a substantially hollow square core 12 while the secondary winding 11 is disposed about an opposite leg of the core 12 and is separated from the core 12 by a relatively large air gap 13. In consequence, the capacity of the secondary winding 11 to the primary winding 10 is substantially nil while the capacity of the winding 11 to the core 12, which is normally grounded, is quite small and of the order of magnitude indicated above. The primary winding 10 is inclosed within a grounded electrostatic shield 10' to reduce the effects of electrostatic fields. Referring again to Figure 2, the secondary winding 11 has its leads 14 and 15 connected to the opposite terminals of a full-wave bridge rectifier 16 comprising diodes 17, 18, 19 and 20. The conjugate terminals 21 and 22 of the rectifier bridge 16 are connected through a filter circuit 23 to two output terminals 25 and 26, the output terminal 26 being connected directly to the terminal 21 of the bridge 16. A voltage regulator tube 27 is connected across the output terminals 25 and 26 and due to the relatively small currents to be regulated, the voltage regulator tube 27 provides all of the voltage regulation that has been found necessary with most circuit configurations.

In the absence of an electrostatic shield, a capacity C1, which is shown by dotted lines, is present between leads 14 and ground and it is believed that this capacity and the corresponding capacity C2 between the lead 15 and secondary 11 and ground are responsible for large voltage disturbances appearing between either of the output terminals 25 and 26 and ground. The repetition frequency of the voltage disturbances generated in the circuit illustrated in Figure 2 is equal to twice the power line frequency and attain magnitudes of the order of 0.3 volt across a 10 thousand ohm load resistance. It is immediately apparent that such voltage disturbances would render the supply unfit for many uses and at least partially offset the desirable low capacity and low cost characteristics of the supply. In the preferred embodiment of the invention the secondary winding 11 of the transformer 9, leads 14 and 15 and the rectifier bridge 16 are disposed within an electrostatic shield 28 directly connected to the output terminal 26 of the power supply. Alternatively, the shield may be connected to the positive terminal 25, but it is preferable to connect it to the negative terminal 26 so as to reduce voltage hazards. For the purposes of analyzing the mechanism for generating the voltage disturbances, reference is made initially to Figure 4 of the accompanying drawings which illustrates the power transformer 9. The secondary winding 11 of the power transformer 9 is connected via a diode D and a resistor R of a filter network F to an output terminal T1 of the power supply. The other end of the winding 11 is directly connected to a terminal T2 of the power supply and through a load resistor L to ground.

It is assumed for the purposes of explanation that the capacity of the transformer secondary winding 11 to ground is lumped in two capacitors C1 and C2 each representing the capacity of a half of the transformer winding 11 and of its associated lead and rectifier to ground. Assuming initially that the upper end of the winding 11 as illustrated in Figure 4 is positive, the diode D is conducting and charges the capacitors of the filter F to develop a positive voltage on the terminal T1. Upon the amplitude of the input voltage generated in the winding 11 reaching its peak and beginning to decrease, the diode D becomes non-conductive thereby producing a sudden cessation of the current in the winding 11 and shock-exciting a parallel resonance circuit constituting the secondary winding 11 and the capacitors C1 and C2. It will be noted that the load resistor L is in shunt with the capacitor C2 and therefore that portion of the voltage generated by the oscillatory circuit appearing across the capacitor C2 also appears across the load resistor L and constitutes the voltage disturbances previously discussed.

Figure 5:
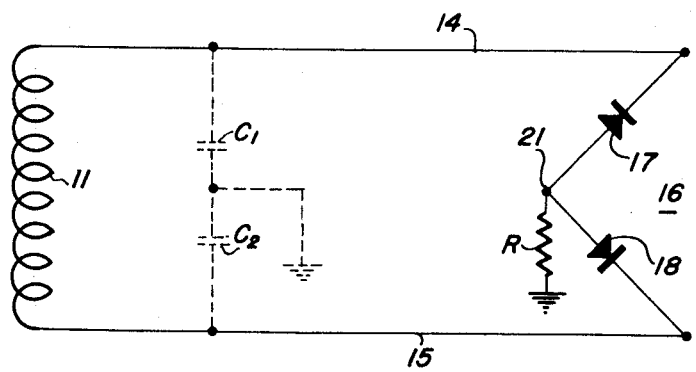

Although the underlying principle relating to the generation of the voltage disturbances in the full-wave bridge rectifier circuit of Figure 2 is the same as the underlying theory developed in Figure 4, the circuit itself is quite different. Referring now to Figure 5 of the accompanying drawings there is illustrated that portion of the circuit of Figure 2 which is material to the discussion relating to the generation of the voltage disturbances in a full-wave bridge rectifier. The reference numerals employed in this figure correspond to those employed in Figure 2.

Referring now specifically to Figure 5, upon cessation of current flow through the winding 11 due to the discontinuance of conduction of the diodes in the bridge rectifier 16, the parallel resonant circuit constituting the secondary winding 11 and the capacitors C1 and C2 is shock-excited and produces a substantial oscillatory voltage which appears across the opposite ends of the bridge rectifier 16 on the leads 14 and 15. The oscillatory voltage appearing across the parallel resonant circuit is sufficiently large to maintain or to produce conduction through the diodes 17 and 18 during the interval that the damped oscillatory voltage exists and therefore the circuit comprising capacitors C1, C2 and diodes 17 and 18 constitutes a four-arm impedance bridge with the load resistor R connected between the conjugate terminals of the bridge. If the impedance of the elements C1 and C2 were identical and the impedance of the elements of 17 and 18 were identical, a perfectly balanced bridge circuit would be obtained and no voltage would appear across the load resistor R. This balance, of course, is not achieved due primarily to non-uniformity of conduction of the diodes 17 and 18 and therefore a voltage does appear across the load resistor R. It should be pointed out however that a considerable balancing effect is achieved by this impedance bridge circuit and therefore the voltage across the load resistor is lower than in other circuit configurations and amounts to only 0.3 volt across the 10,000 ohm resistor as opposed to a considerably greater voltage produced by the circuit of Figure 4.

Figure 6:
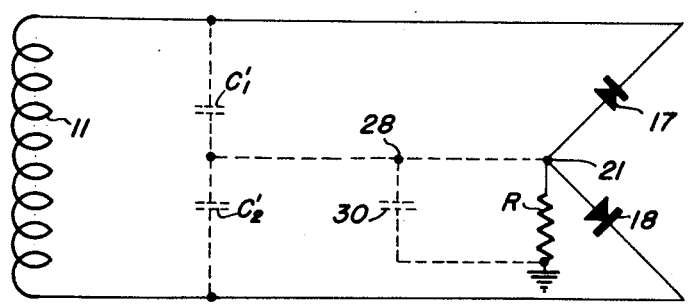

As previously indicated, the voltages produced by the oscillatory circuit may be substantially completely eliminated from the load resistance R by employing the shield 28 and connecting the shield to one of the output terminals. Reference is now made to Figure 6 of the accompanying drawings wherein the shield 28 is represented by a wire connection between the junction of the capacitors C1' and C2' and the conjugate terminal 21 of the bridge 16. In consequence upon conduction of either of the diodes 17 or 18 due to the oscillatory voltage generated in the tank circuit, the oscillatory voltage is directly connected via shield 28 to the junction of the two capacitors and completely by-passes the load resistor R. Another way of stating this proposition is that in the circuit of Figure 5 the only complete circuit for conduction between the junction of the capacitors C1 and C2 and the terminal 21 of the bridge 16 is through the load resistor whereas in Figure 6 the shield 28 provides the conduction path between the junction of the capacitors $C'_1$ and $C'_2$ and the junction 21 and therefore completely by-passes the load resistor. The shield 28 is discontinuous so as to prevent it from functioning as a short circuited secondary winding of the transformer 9.

The shield 28 eliminates the capacity between the winding 11 to ground and substitutes the capacity of the shield to ground, this capacity being represented by the capacitor 30 in Figure 2. Since the shield 28 is directly connected to the negative side of the supply and therefore to the output terminals 26, the voltage of the shield 28 with respect to ground varies only at the signal frequency. This may be readily seen by referring to Figure 1 where it is evident that the negative terminal of the supply 5, being connected to ground through the load resistor 6, varies with respect to ground at the frequency of the signal across the resistor 6 and is at the same voltage as the grid 7 of the tube 8. In consequence the capacity 30 which is only 20 micro micro-farads or less directly shunts the load resistor 6 and is effective only in limiting the high frequency response of the amplifier.

The effectiveness of the shield 28 is demonstrated by the fact that although voltage disturbances without the shield may assume values of 0.3 volt across a 10 thousand ohm resistance, voltage disturbances of a maximum of 50 microvolts occurred across a 10 thousand ohm load with the shield 28 employed.

Referring again to Figure 3 of the accompanying drawings for a description of a physical embodiment of the power supply of the present invention, a single secondary winding 11 is wound on a bobbin 32 comprising a hollow square having a U-shaped cross-section. The side members and bottom member of the bobbin 32 include a dielectric material coated with copper or other suitable conductive material 33. To complete the conductive shield about the winding 11, a metal strip 34 is wound about the bobbin 32 parallel to the direction of the individual turns of the winding 11 and is supported on the side walls of the bobbin 32 so as to completely enclose the winding and make electrical contact with the conductive material 33 on the sides of the bobbin. The conductive material 33 is slotted as at 35 so as to prevent it from forming a short-circuited turn. It should be noted, although it is not illustrated, that the strip 34 is also discontinuous for the same reason.

In the apparatus illustrated in Figure 3 the rectifiers may be mounted on the inner surfaces of the bobbin 47 so as to be enclosed within the electrostatic shield. Preferably, however, the rectifiers 17—20 are mounted on an elongated T-shaped insulator 36 seated on top of the winding 11 and between the sides of the bobbin 32. The rectifiers 17 and 18 are aligned along one side of the member 36 and a lead 37 of diode 17 is connected to a lead 38 of diode 18. The leads 37 and 38 are secured to a common aperture in the member 36 and soldered to the lead 14 of the secondary winding 11. Similarly a lead 40 of the diode 19 and a lead 41 of diode 20 are connected together and secured in a common aperture in the member 35 and are soldered to lead 15 from the secondary winding 11. The other leads 42 and 43 of each of rectifiers 17 and 20, respectively, are passed through member 36 and soldered to the lead from terminal 21 of bridge 16 to the terminal 26. The other leads 44 and 45 of the rectifiers 18 and 19, respectively, are connected together through a common aperture in the member 36 to form terminal 22 of the bridge 16 and are soldered to the lead to the filter circuit 23. Soldering of the appropriate leads of the rectifiers 17—20 to the leads 14 and 15 of the secondary winding 11 taken in conjunction with the shield or metal strip 34 insures adequate support for the member 36 and the rectifiers 17—20 so that they are securely held in place on the winding 11. The leads from the bridge 16 may be brought out through the slot in the shield 34. In the arrangement thus provided the secondary winding and the rectifiers are substantially completely isolated from ground and although the voltage disturbances of the supply may be reduced by shielding the secondary winding 11 only, the arrangement wherein the leads 14 and 15 from the secondary winding and the rectifiers of the bridge 16 are all enclosed within the shield has proven to be the only arrangement which substantially completely eliminates the voltage disturbances previously discussed.

In another embodiment of the present invention illustrated in Figure 7 of the accompanying drawings, the secondary 11 is composed of two half windings 11a and 11b disposed on a bobbin 46 and the two windings are insulated from one another by a centrally apertured rectangular disc 47 of insulating material. The rectifiers 17, 18, 19 and 20 are supported on the disc 47 with adjacent leads of the rectifiers 17 and 18 connected together and extend through spacer 47 where they connect to the lead 14 which constitutes the end of the outer turn of wire of the winding 11b. The other lead of the diode 18 and a lead of the diode 19 pass through the spacer 47 and are connected together and to a lead which is connected to the filter circuit 23. The other lead of the diode 19 and a lead of the diode 20 are connected together and pass through the spacer 47 where they connect to the lead 15 constituting the end of the outer turn of wire of the coil 11a. The other leads 42 of the diodes 17 and 20 pass through the spacer 47 and are connected together and to a lead constituting the other lead from the bridge 16 to the filter 23. Thus, the spacer 33 is also utilized as a support for the diodes of the bridge 16, the diodes being arranged so that the leads of the various diodes which are to be connected together pass through apertures in the spacer 33 in which they are supported.

The purpose for utilizing the two secondary windings 11a and 11b is to prevent the necessity of bringing one end of a single secondary winding up from the innermost end to the outermost end of the winding to make connection to the diodes. Specifically, where a single winding is employed the end of the outer turn constituting one end of the secondary is readily available, but the other end of the secondary winding constituting the end of the inner turn of the winding must be brought up along the edge of the winding on the inner surfaces of the bobbin.

In those power supplies which are disposed to provide high voltage the close proximity of a lead from one end to the winding imposes a severe strain upon the voltage insulation due to the extreme voltage differential existing between the one end of the coil and the other. By splitting the secondary into the coils 11a and 11b and connecting together the ends of the two innermost turns by passing one of these ends through an appropriately positioned aperture in the spacer 47, the two ends of the secondary winding which are to be connected to the rectifier bridge 16 are readily available at the upper surface of the windings and the aforesaid problems are eliminated. The shield 28 is provided by coating the outer surfaces of the bobbin 46 with conductive material. The windings 11a and 11b may be wrapped in a foil which is insulated from the windings and the rectifiers by a dielectric tape with the foil being electrically connected to a conductive material 48 formed with the outer surfaces of the bobbin 46. Preferably and as illustrated in Figures 3 metal strip 49 is wound about the edges of bobbin 46.

The conductive material 48 is slotted as at 50 so that a shorted secondary is not provided and a gap is maintained between the ends of the strip 49 for the same reason.

In consequence of the structure of the apparatus of the present invention and the connection of the shield 28 to an output terminal of the supply, the present invention provides an individual power supply for vacuum tubes which permits the supply to be connected between the plate of a vacuum tube and a load impedance having one end grounded so that direct coupling without voltage bias problems may be employed and a very low shunting capacity provided across the load impedance. Further, the serious problem of voltage interference from noise at power line frequency and/or at harmonics thereof is completely eliminated to thus provide a very compact and highly useful single tube power supply. The reduction of the voltage disturbances effected by the apparatus of the present invention is quite considerable reducing the amplitudes of the disturbances from 0.3 volt to 50 microvolts across a 10,000 ohm resistor, a factor of 6,000. It must be emphasized that the shield 28 of the present invention is not primarily employed to shield the coil from externally generated voltage disturbances, although it serves this purpose also, but is employed primarily to alter the path of the oscillatory voltages so as to by-pass the load impedance.

The power supply has been described as employing a transformer having its primary and secondary windings displaced along the core, a useful supply may include a transformer having the winding separated merely by an air gap and it is not intended to limit the invention to the specific transformer construction illustrated although the illustrated form is preferable.

While we have described and illustrated one specific embodiment of our invention, it will be clear that variations of the general arrangement and of the details of construction which are specifically illustrated and described may be resorted to without departing from the true spirit and scope of the invention as defined in the appended claims.

What we claim is:

1. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance, and the other of said output terminals being connected to said second electrode, said other end of said load impedance and said second electrode being at substantially the same signal potential, said power supply further comprising a transformer having a primary winding and a secondary winding, a discontinuous electrostatic shield substantially surrounding said secondary winding, a circuit for converting alternating current to direct current and including a pair of input leads, at least one asymmetrically conducting device and a pair of output leads connected to said output terminals, said secondary winding being connected across said input leads, and said shield being connected to one of said output leads.

2. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance, and the other of said output terminals being connected to said second electrode, said other end of said load impedance and said second electrode being at substantially the same signal potential, said power supply further comprising a transformer having a primary winding and a secondary winding, a discontinuous electrostatic shield substantially completely surrounding said secondary winding, a circuit for converting alternating current to direct current and including a pair of input leads, at least one asymmetrically conducting device and a pair of output leads connected to said output terminals, said asymmetrically conducting device being disposed within said shield, said secondary winding being connected across said input leads, and said shield being connected to one of said output leads.

3. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance and the other of said output terminals being connected to said second electrode, said other end of said load impedance and said second electrode being at substantially the same signal potential, said power supply further comprising a transformer having a primary winding, a secondary winding and a core of magnetic material, said primary winding and said secondary winding being physically displaced along said core, a rectifier circuit having input leads and output leads connected to said output terminals, means connecting said secondary winding across said input leads, a discontinuous electrostatic shield substantially completely surrounding said secondary winding and means connecting said shield to one of said output leads.

4. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance, and the other of said output terminals being connected to said second electrode, said other end of said load impedance and said second electrode being at substantially the same signal potential, said power supply further comprising a transformer having a primary winding, a secondary winding and a core of magnetic material, said primary winding and said secondary winding being physically displaced from one another along said core with said secondary winding separated from said core by a gap, a rectifier circuit connected across said secondary winding, a discontinuous electrostatic shield substantially completely surrounding said secondary winding, said rectifier circuit having a pair of output leads connected to said output terminals and means connecting said shield to one of said output leads.

5. The combination in accordance with claim 4 wherein said rectifier circuit is disposed within said shield.

6. The combination in accordance with claim 4 wherein said shield comprises a conductive bobbin on which said secondary winding is wound, said bobbin having a transverse slot extending therethrough.

7. The combination according to claim 6 wherein said shield further comprises a conductive cover disposed about the periphery of said secondary winding and electrically connected to said bobbin.

8. The combination in accordance with claim 4 wherein said secondary winding comprises first and second half windings and means connecting the ends of the outer turn of each half winding to said rectifier circuit.

9. The combination in accordance with claim 8 further comprising a non-conductive member separating said half windings and means for mounting said rectifiers on said non-conductive member.

10. The combination in accordance with claim 9 wherein said non-conductive member and said rectifiers are disposed within said shield.

11. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance, and the other of said output terminals being connected to said second electrode, said other end of said load impedance and said second electrode being at substantially the same signal potential, said power supply further comprising a transformer having a primary winding, a secondary winding and a core of magnetic material, said primary winding and said secondary winding being physically displaced along said core, said secondary winding being supported on said core with a large continuous spacing therebetween, output leads connected to said output terminals, a rectifier circuit connected between said secondary winding and said output leads and shield means for preventing voltage disturbances from appearing across said output leads which result from charging and discharging of stray capacities existing between a point of reference potential and at least said secondary winding.

12. In combination an amplifying device having a first and second electrode, a load impedance for said amplifying device, a lead having a reference potential applied thereto, said lead connecting said first electrode to one end of said load impedance, a power supply having two output terminals, one of said output terminals being connected to the other end of said load impedance, and the other of said output terminals being connected to said second electrode, said other end of said load impedance and said second electrode being at substantially the same signal potential, said power supply further comprising a transformer having a primary winding, a secondary winding and a core of magnetic material, said secondary winding being physically displaced from said primary winding and said core by an air gap, a rectifier circuit having input leads and output leads connected to said output terminals, means connecting said secondary winding across said output leads, a discontinuous electrostatic shield substantially completely surrounding said secondary winding and means connecting said shield to one of said output leads.

13. In combination, an electric circuit having at least one impedance and a power supply connected in series circuit with said impedance means for developing a variable signal potential across said impedance, said power supply having output terminals connected to points in said circuit whose respective potentials vary equally in accordance with variations of the signal potential developed across said impedance, said power supply comprising a transformer having a primary winding and a secondary winding, a discontinuous electrostatic shield substantially surrounding said secondary winding, a full-wave rectifier circuit for converting alternating current to direct current and including a pair of input leads, two asymmetrically conducting devices and a pair of output leads connected to said output terminals, said secondary winding being connected across said input leads, and said shield being connected to one of said output leads.

14. In combination, an electric circuit having at least one impedance and a power supply connected in series circuit with said impedance means for developing a variable signal potential across said impedance, said power supply having output terminals connected to points in said circuit whose respective potentials vary equally in accordance with variations of the signal potential developed across said impedance, said power supply comprising a transformer having a primary winding and a secondary winding, a discontinuous electrostatic shield substantially completely electrically shielding said secondary winding, a full-wave rectifier circuit for converting alternating current to direct current and including a pair of input leads, two asymmetrically conducting devices and a pair of output leads connected to said output terminals, said secondary winding being connected across said input leads, and said shield being connected to one of said output leads.

15. In combination, an electric circuit having at least one impedance, a power supply connected in series circuit with said impedance and isolated from ground potential, means for developing a variable signal potential across said impedance, said power supply having output terminals connected to points in said circuit whose respective potentials vary equally in accordance with variations of the signal potential developed across said impedance, said power supply comprising a transformer having a primary winding and a secondary winding, a full wave rectifier circuit for converting alternating current to direct current and including a pair of input leads, at least two asymmetrically conducting devices and a pair of output leads connected to said output terminals, said secondary winding being connected across said input leads, and means for eliminating noise in said circuit resulting from ringing of a resonant circuit including the inductance of said secondary winding and its stray capacity to ground potential, said means including a discontinuous electrostatic shield substantially surrounding said secondary winding and connected to one of said output leads.

16. The combination according to claim 15 wherein said shield also surrounds said asymmetrically conducting devices.

References Cited in the file of this patent

UNITED STATES PATENTS

| | | |
|---|---|---|
| 1,687,253 | Latour | Oct. 9, 1928 |
| 1,692,904 | Potter | Nov. 27, 1928 |
| 1,723,584 | Shoemaker | Aug. 6, 1929 |
| 1,789,664 | White | Jan. 30, 1931 |
| 2,028,191 | Chereton | Jan. 21, 1936 |
| 2,549,833 | Martinez | Apr. 24, 1951 |
| 2,652,521 | Westphal | Sept. 15, 1953 |
| 2,878,441 | Rogers et al. | Mar. 17, 1959 |

OTHER REFERENCES

Reaves: "Bias Supplies for Direct Coupled Circuits," Electronics August 1954, pages 172–173.